US 9,554,259 B2

(12) United States Patent
Tiwari (10) Patent No.: US 9,554,259 B2
(45) Date of Patent: Jan. 24, 2017

(54) METHODS FOR HANDLING A SERVICE REQUEST PROCEDURES, AND APPARATUSES USING THE SAME (71) Applicant: HTC Corporation, Taoyuan, Taoyuan County (TW)

(72) Inventor: Kundan Tiwari, Taoyuan (TW)

(73) Assignee: HTC Corporation, Taoyuan (TW)

( * ) Notice: Subject to any disclaimer, the term of this patent is extended or adjusted under 35 U.S.C. 154(b) by 35 days.

(21) Appl. No.: 14/542,012

(22) Filed: Nov. 14, 2014

(65) Prior Publication Data
US 2015/0140948 A1 May 21, 2015

Related U.S. Application Data (60) Provisional application No. 61/904,468, filed on Nov. 15, 2013.

(51) Int. Cl.
*H04M 11/04* (2006.01)
*H04W 4/22* (2009.01)
*H04W 76/02* (2009.01)
*H04L 29/06* (2006.01)
*H04W 76/00* (2009.01)

(52) U.S. Cl.
CPC ............. *H04W 4/22* (2013.01); *H04L 69/28* (2013.01); *H04W 76/027* (2013.01); *H04W 76/028* (2013.01); *H04W 76/007* (2013.01)

(58) Field of Classification Search
CPC ...... H04W 48/12; H04W 4/22; H04W 76/007; H04W 36/14; H04W 48/18; H04W 76/025; H04W 28/0215; H04W 4/005; H04W 74/02; H04W 76/028; H04W 76/027; H04L 12/403; H04L 12/417; H04L 69/28

USPC .... 455/404.1, 434, 68, 435.1; 370/447, 254, 370/331
See application file for complete search history.

(56) References Cited

U.S. PATENT DOCUMENTS

| 6,493,629 | B1 | 12/2002 | Van Bosch |
| 8,989,741 | B2* | 3/2015 | Tamaki ............. H04W 36/0011 455/436 |
| 2002/0071449 | A1* | 6/2002 | Ho ........................ H04L 12/403 370/447 |

(Continued)

FOREIGN PATENT DOCUMENTS

| EP | 1 814 170 A1 | 8/2007 |
| EP | 2 482 606 A2 | 8/2012 |
| KR | 10-2008-0046995 A | 5/2008 |

OTHER PUBLICATIONS

3GPP TSG-CT WG1 Meeting #88bis C1-143764, "Trigger to re-initiate service request procedure", Sophia-Antipolis (France), Oct. 20-24, 2014, published on Oct. 11, 2014.

(Continued)

*Primary Examiner* — Mahendra Patel
(74) *Attorney, Agent, or Firm* — Birch, Stewart, Kolasch & Birch, LLP (57) ABSTRACT

A method for handling a service request procedure by a mobile communication device is provided. The method includes the steps of: starting a back-off timer associated with a service request procedure in response to the service request procedure for a normal service having been failed for a maximum number of retries, and initiating another service request procedure for an emergency bearer service before the back-off timer expires.

4 Claims, 8 Drawing Sheets

(56) References Cited

U.S. PATENT DOCUMENTS

| | | | | |
|---|---|---|---|---|
| 2008/0102784 A1* | 5/2008 | Mittal | ................... | H04M 11/04 |
| | | | | 455/404.1 |
| 2012/0166865 A1* | 6/2012 | Liu | ..................... | H04H 20/82 |
| | | | | 714/4.11 |
| 2012/0275401 A1* | 11/2012 | Sun | ..................... | H04W 72/04 |
| | | | | 370/329 |
| 2013/0182607 A1* | 7/2013 | Kim | ................... | H04W 76/025 |
| | | | | 370/254 |
| 2013/0201870 A1 | 8/2013 | Gupta | | |
| 2014/0024331 A1* | 1/2014 | Hsu | ..................... | H04W 36/28 |
| | | | | 455/404.1 |
| 2015/0282009 A1* | 10/2015 | Iwai | ................... | H04W 24/10 |
| | | | | 455/436 |

OTHER PUBLICATIONS

3GPP TS 24.301 V12.4.0 (Mar. 2014), "3rd Generation Partnership Project; Technical Specification Group Core Network and Terminals; Non-Access-Stratum (NAS) protocol for Evolved Packet System (EPS); Stage 3 (Release 12)", Technical Specification, published on Mar. 2014.

3GPP TSG-CT WG1 Meeting #86bis C1-141644, "Handling of Service request procedure for emergency bearer services", Dubrovnik, Croatia, Mar. 31, 2014 -Apr. 4, 2014, published on Apr. 4, 2014.

3rd Generation Partnership Project, "Technical Specification Group Core Network and Terminals; Non-Access-Stratum (NAS) Protocol for Evolved Packet System (EPS); Stage 3 (Release 12)," 3GPP TS 24.301, V12.2.0, XP-002738923, Sep. 2013, 40 pages.

* cited by examiner

METHODS FOR HANDLING A SERVICE REQUEST PROCEDURES, AND APPARATUSES USING THE SAME

CROSS REFERENCE TO RELATED APPLICATIONS

This Application also claims priority of U.S. Provisional Application No. 61/904,468, filed on Nov. 15, 2013, the entirety of which is incorporated by reference herein.

BACKGROUND OF THE INVENTION

Field of the Invention

The invention generally relates to the handling of service request procedures, and more particularly, to methods for handling service request procedures, and apparatuses using the same.

Description of the Related Art

In a typical mobile communication environment, User Equipment (UE), such as a mobile phone, smartphone, laptop computer, or panel Personal Computer (PC), etc., may communicate voice and/or data signals with one or more service networks. The wireless communications between the UE and the service network(s) may be in compliance with various Radio Access Technologies (RATs), including the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, or Time Division-LTE (TD-LTE) technology, and others.

Taking the WCDMA/LTE technology in compliance with the 3GPP TS 24.301 specification, v12.4.0 (referred to herein as the TS 24.301 specification) and the 3GPP TS 24.008 specification, v12.7.0 (referred to herein as the TS 24.008 specification) as an example, a UE has to start a back-off timer when a service request procedure has failed for a maximum number of retries, wherein the back-off timer refrains the UE from initiating the service request procedure till it expires. The design of the back-off timer is to grant the service network sufficient time for recovering from temporary problems. However, when the back-off timer is running, not only is it not allowed to initiate the service request procedure for a normal service, but it's also not allowed to initiate the service request procedure for an emergency bearer service. As a result, the UE will be delayed in obtaining an emergency bearer service.

In addition, the start of the back-off timer may imply that a particular node (e.g., the Mobility Management Entity (MME)) of the service network is facing some sort of problem and temporarily cannot process the UE's service requests. However, the UE remains forbidden from initiating the service request procedure even when it has successfully registered with another Routing Area (RA), Tracking Area (TA), or Public Land Mobile Network (PLMN), or even when it has switched to use another Radio Access Technology (RAT), which implies that the UE has changed to register with another node of the same service network or with another service network. As a result, the UE cannot obtain either a normal service or an emergency bearer service as it should in the newly registered area or network.

BRIEF SUMMARY OF THE INVENTION

In order to solve the above-mentioned problem, the invention proposes to properly handle the back-off timer, while allowing the UE to initiate the service request procedure for an emergency bearer service, or to initiate the service request procedure for either a normal service or an emergency bearer service upon successfully registered with another PLMN, RA, or TA, or with the same PLMN using another RAT.

In a first aspect of the invention, a method for handling a service request procedure by a mobile communication device is provided. The method comprises the steps of: starting a back-off timer associated with a service request procedure in response to the service request procedure for a normal service having been failed for a maximum number of retries; and initiating another service request procedure for an emergency bearer service before the back-off timer expires.

In a second aspect of the invention, a method for handling a service request procedure by a mobile communication device is provided. The method comprises the steps of: failing a service request procedure for an emergency bearer service with a service network for a maximum number of retries; and initiating the service request procedure for an emergency bearer service with the service network when the service request procedure for an emergency bearer service has failed for the maximum number of retries.

In a third aspect of the invention, a method for handling a service request procedure by a mobile communication device is provided. The method comprises the steps of: starting a back-off timer associated with a service request procedure in response to the service request procedure having been failed for a maximum number of retries using an RAT when the mobile communication device is registered with a PLMN, RA, or TA; stopping the back-off timer when the mobile communication device is successfully registered with another PLMN, RA, or TA, or successfully registered with the same PLMN using another RAT; and initiating the service request procedure in response to stopping the back-off timer when the mobile communication device is successfully registered with another PLMN, RA, or TA, or successfully registered with the same PLMN using another RAT.

Other aspects and features of the present invention will become apparent to those with ordinarily skill in the art upon review of the following descriptions of specific embodiments of methods for handling a service request procedure.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. Note that the 3GPP specification(s) described herein are used to teach the spirit of the invention, and the invention is not limited thereto.

Figure 1:
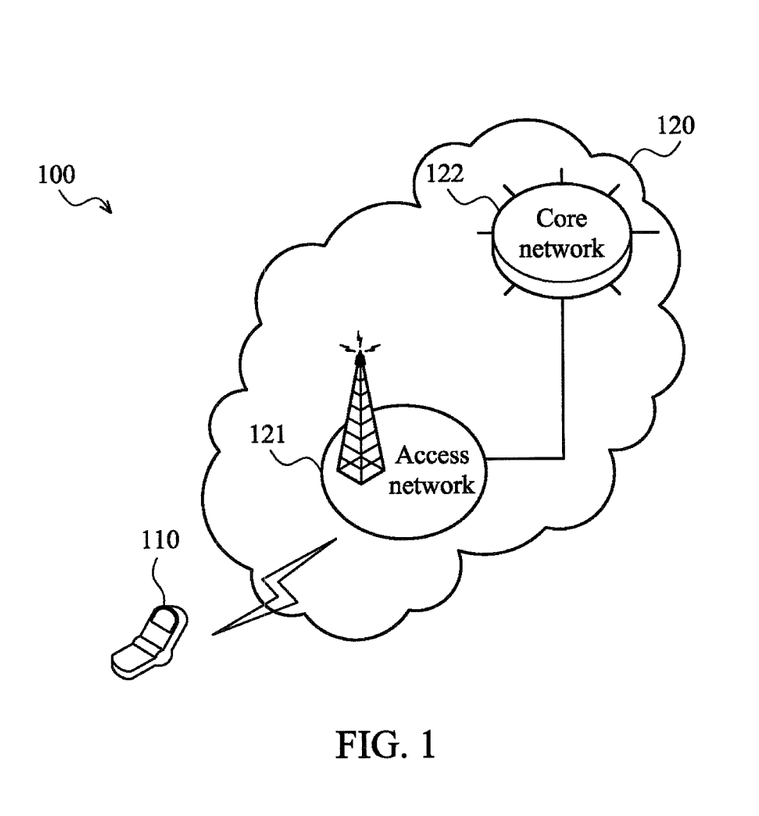
FIG. 1 is a block diagram illustrating a mobile communication environment according to an embodiment of the invention.

FIG. 1 is a block diagram illustrating a mobile communication environment according to an embodiment of the invention. In the mobile communication environment 100, the mobile communication device 110 is wirelessly connected to the service network 120 for obtaining wireless services, including normal service(s) and emergency bearer service(s). For example, the mobile communication device 110 may be a mobile phone, a smartphone, a laptop computer, a panel PC, or any computing device supporting at least the RAT utilized by the service network 120. The service network 120 comprises an access network 121 and a core network 122, wherein the access network 121 is responsible for processing radio signals, terminating radio protocols, and connecting the mobile communication device 110 with the core network 122, and the core network 122 is responsible for performing mobility management, network-side authentication, and interfaces with public networks. In one embodiment, the service network 120 may belong to a PLMN, and the access network 121 may include multiple RAs or TAs, wherein each RA or TA is formed by a group of base stations.

For example, if the service network 120 is a WCDMA system, the access network 121 may be a Universal Terrestrial Radio Access Network (UTRAN) which includes at least a Node-B (NB) and a Radio Network Controller (RNC), and the core network 122 may be a General Packet Radio Service (GPRS) core which includes a Home Location Register (HLR), at least one Serving GPRS Support Node (SGSN), and at least one Gateway GPRS Support Node (GGSN). Alternatively, if the service network 120 is an LTE/LTE-A system, the access network 121 may be an Evolved-UTRAN (E-UTRAN) which includes at least an evolved NB (eNB), and the core network 122 may be an Evolved Packet Core (EPC) which includes a Home Subscriber Server (HSS), Mobility Management Entity (MME), Serving Gateway (S-GW), and Packet Data Network Gateway (PDN-GW or P-GW).

Although not shown, the mobile communication device 110 may be wirelessly connected to more than one service network. For example, each of the plurality of service networks may belong to a respective PLMN, so that the mobile communication device 110 may select one of the PLMN to obtain the wireless services.

Figure 2:
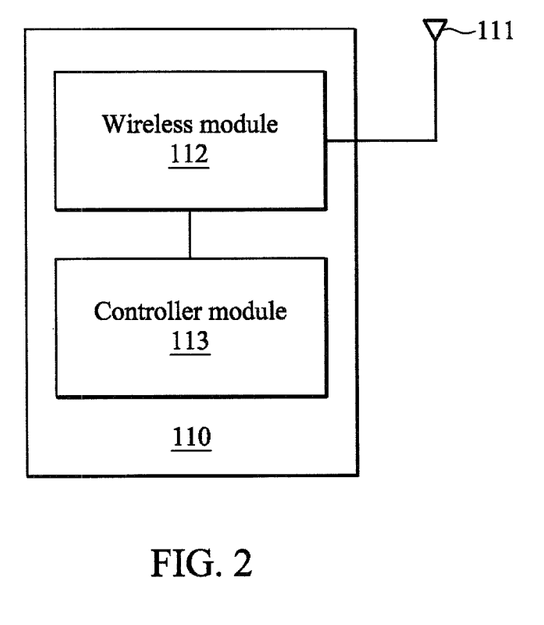
FIG. 2 is a block diagram illustrating the mobile communication device 110 according to an embodiment of the invention.

FIG. 2 is a block diagram illustrating the mobile communication device 110 according to an embodiment of the invention. The mobile communication device 110 comprises a wireless module 112 for performing the functionality of wireless transmission and reception to and from the service network 120 via an antenna 111, and a controller module 113 for controlling the operation of the wireless module 112 and other functional components, such as a display unit and/or keypad serving as the Man-Machine Interface (MMI), a storage unit storing instruction sets and/or program codes of applications and communication protocols, or others. More specifically, the controller module 113 controls the wireless module 112 for performing the methods of the invention for handling the service request procedure.

To further clarify, the wireless module 112 may be a Radio Frequency (RF) unit, and the controller module 113 may be a general-purpose processor or a Micro-Control Unit (MCU) of a baseband unit. The baseband unit may contain multiple hardware devices to perform baseband signal processing, including Analog-to-Digital Conversion (ADC)/Digital-to-Analog Conversion (DAC), gain adjusting, modulation/demodulation, encoding/decoding, and so on. The RF unit may receive RF wireless signals via the antenna 111, convert the received RF wireless signals to baseband signals, which are processed by the baseband unit, or receive baseband signals from the baseband unit and convert the received baseband signals to RF wireless signals, which are later transmitted via the antenna 111. The RF unit may also contain multiple hardware devices to perform radio frequency conversion. For example, the RF unit may comprise a mixer to multiply the baseband signals with a carrier oscillated in the radio frequency of the RAT technology, wherein the radio frequency may be 900 MHz, 1900 MHz, or 2100 MHz utilized in WCDMA technology, or 900 MHz, 2100 MHz, or 2.6 GHz utilized in LTE/LTE-Advanced technology, or others depending on the RAT in use.

Figure 3:
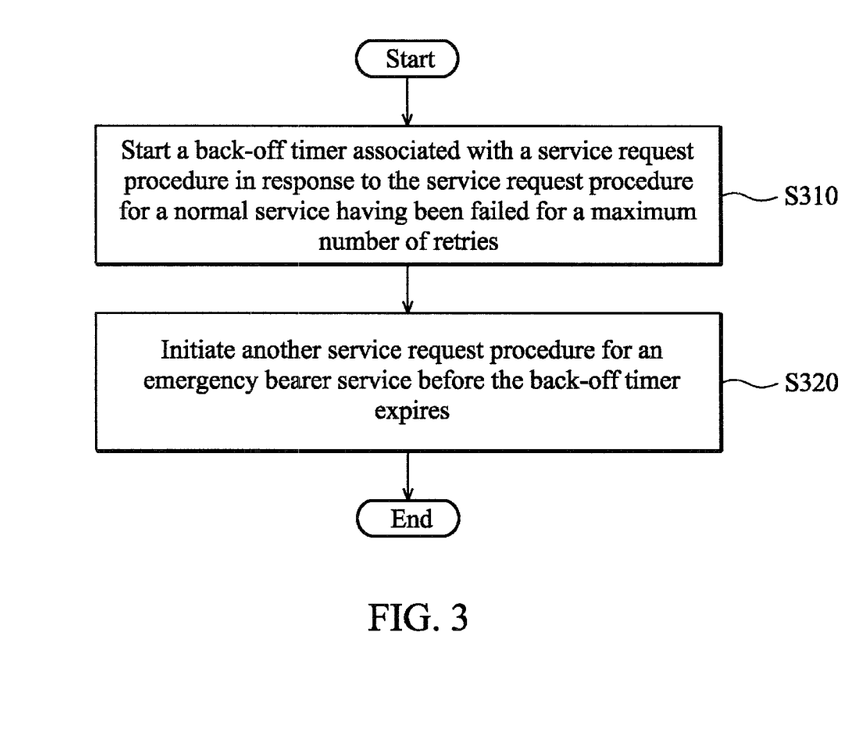
FIG. 3 is a flow chart illustrating the method for handling a service request procedure by a mobile communication device according to an embodiment of the invention.

FIG. 3 is a flow chart illustrating the method for handling a service request procedure by a mobile communication device according to an embodiment of the invention. To begin, the mobile communication device starts a back-off timer associated with a service request procedure in response to the service request procedure for a normal service having been failed for a maximum number of retries (step S310). That is, the service request for a normal service has been repeated for the maximum number of retires and has still failed, so the back-off timer is started to prevent the mobile communication device from initiating any service request procedure till it expires. Next, unlike conventional UE which is not allowed to initiate any service request procedure for either a normal service or an emergency bearer service, the mobile communication device initiates another service request procedure for an emergency bearer service before the back-off timer expires (step S320). That is, the mobile communication device is allowed to initiate the service request procedure for an emergency bearer service even when the back-off timer is still running. Thus, the mobile communication device of the invention can obtain an emergency bearer service, without the undesirable delay conventionally introduced by the back-off timer.

Figure 4:
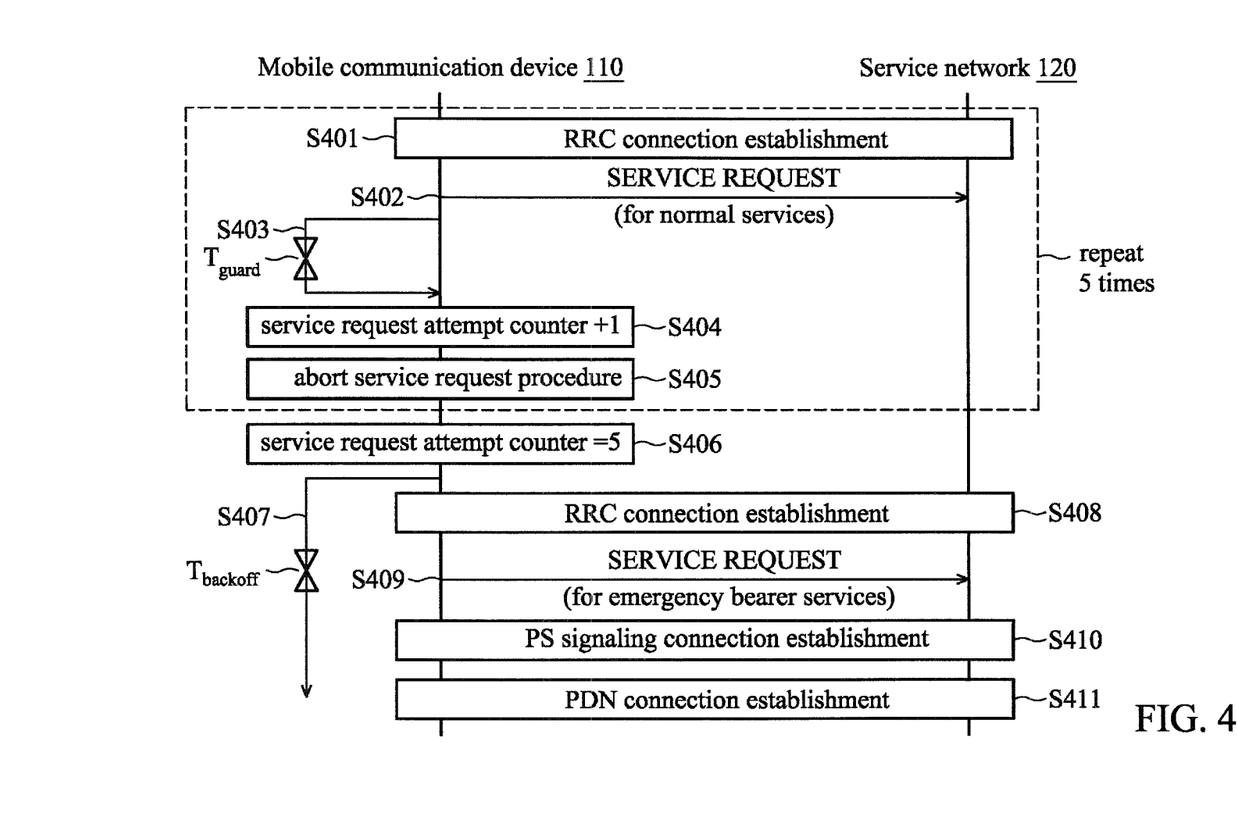
FIG. 4 is a message sequence chart illustrating the handling of service request procedures with back-off timer control according to the embodiment of FIG. 3.

FIG. 4 is a message sequence chart illustrating the handling of service request procedures with back-off timer control according to the embodiment of FIG. 3. To begin, the mobile communication device 110 initiates a service request procedure for a normal service. Specifically, the mobile communication device 110 establishes a Radio Resource Control (RRC) connection with the service network 120 for signaling (step S401). The RRC connection establishment includes sending an RRC CONNECTION REQUEST message to the service network 120, receiving an RRC CONNECTION SETUP message from the service network 120, and replying with an RRC CONNECTION SETUP COMPLETE message to the service network 120, wherein the establishment cause in the RRC CONNECTION REQUEST message is set to a non-emergency case. When the RRC connection is successfully established, the mobile communication device 110 sends a SERVICE REQUEST message to the service network 120 (step S402), and starts a guard timer $T_{guard}$ when sending the SERVICE REQUEST message (step S403). In this embodiment, due to the service network 120 facing some temporary problems, the mobile communication device 110 does not receive any response corresponding to the SERVICE REQUEST message from the service network 120 before the guard timer $T_{guard}$ expires. When the guard timer $T_{guard}$ expires, the mobile communication device 110 increases the service request attempt counter by 1 (step S404), and then aborts the service request procedure (step S405).

In response to aborting the service request procedure, the mobile communication device 110 repeats steps S401 to S405 for 4 more times till the value of the service request attempt counter reaches 5 (i.e., the maximum number of retries). When determining that the service request attempt counter equals 5 (step S406), the mobile communication device 110 starts a back-off timer $T_{backoff}$ associated with the service request procedure (step S407). Although the initiation of the service request procedure for a normal service is forbidden when the back-off timer $T_{backoff}$ is running, the mobile communication device 110 of the invention can initiate a service request procedure for establishing a Packet Data Network (PDN) connection for an emergency bearer service. Specifically, the mobile communication device 110 establishes an RRC connection with the service network 120 for signaling (step S408), wherein the RRC connection establishment is similar to step S401, except that the establishment cause in the RRC CONNECTION REQUEST message indicates an emergency case.

When the RRC connection is successfully established, the mobile communication device 110 sends a SERVICE REQUEST message to the service network 120 before the back-off timer $T_{backoff}$ expires, to establish a Packet-Switched (PS) signaling connection (step S409). Meanwhile, the back-off timer $T_{backoff}$ is kept running. Subsequently, the service network 120 accepts the request and establishes a PS signaling connection with the mobile communication device 110 (step S410). After the PS signaling connection is successfully established, the mobile communication device 110 establishes a PDN connection with the service network 120 for the emergency bearer service (step S411).

In one embodiment, while keeping the back-off timer $T_{backoff}$ running, the SERVICE REQUEST message in step S409 may be sent with the same PLMN (compared to the PLMN to which the SERVICE REQUEST message in step S402 is sent) using another RAT (compared to the RAT which is used for sending the SERVICE REQUEST message in step S402), or it may be sent to another PLMN (compared to the PLMN to which the SERVICE REQUEST message in step S402 is sent). That is, the service network 120 may support multiple RATs or include more than one PLMN, or alternatively, the SERVICE REQUEST message in step S409 may be sent to another service network supporting an RAT other than the one supported by the service network 120, or it may be sent to another service network belonging to a PLMN different from the one to which the service network 120 belongs.

In another embodiment, instead of keeping the back-off timer $T_{backoff}$ running, the mobile communication device 110 may stop the back-off timer $T_{backoff}$ when initiating the service request procedure for establishing a PDN connection for an emergency bearer service.

Figure 5:
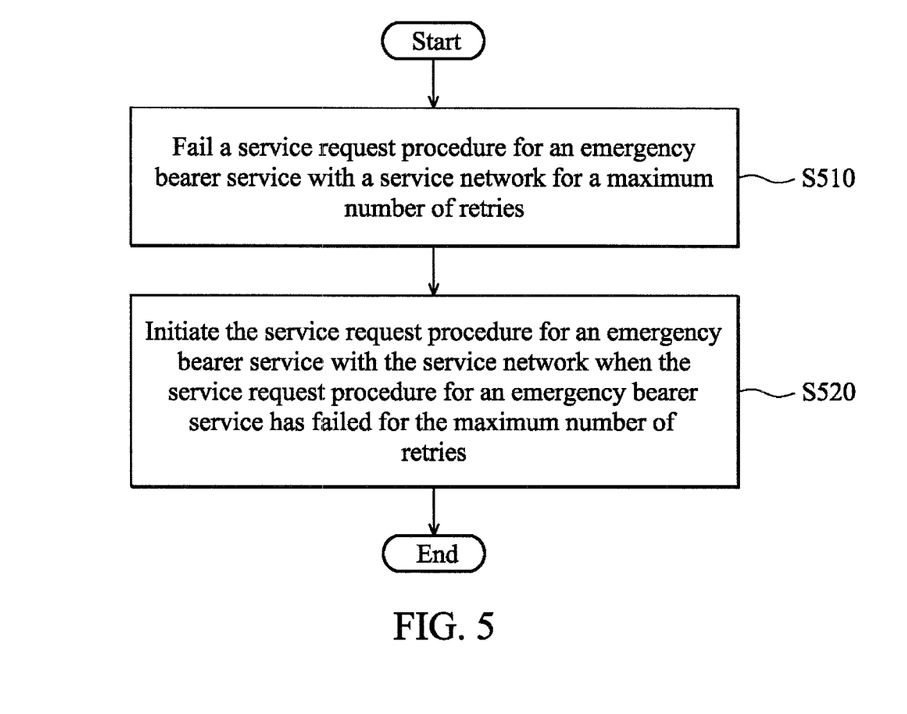
FIG. 5 is a flow chart illustrating the method for handling a service request procedure by a mobile communication device according to another embodiment of the invention.

FIG. 5 is a flow chart illustrating the method for handling a service request procedure by a mobile communication device according to another embodiment of the invention. To begin, the mobile communication device fails a service request procedure for an emergency bearer service with a service network for a maximum number of retries (step S510). That is, the service request for an emergency bearer service has been repeated for its maximum number of retries and still failed. Next, the mobile communication device initiates the service request procedure for an emergency bearer service with the service network when the service request procedure for an emergency bearer service has failed for the maximum number of retries (step S520). That is, unlike conventional UE which is not allowed to initiate the service request procedure for an emergency bearer service upon reaching the maximum number of retries, the mobile communication device is allowed to initiate the service request procedure since the request is for an emergency bearer service. Thus, the mobile communication device of the invention can keep trying the service request procedure for an emergency bearer service, regardless of the undesirable restriction conventionally introduced by the maximum number of failed retries.

Figure 6:
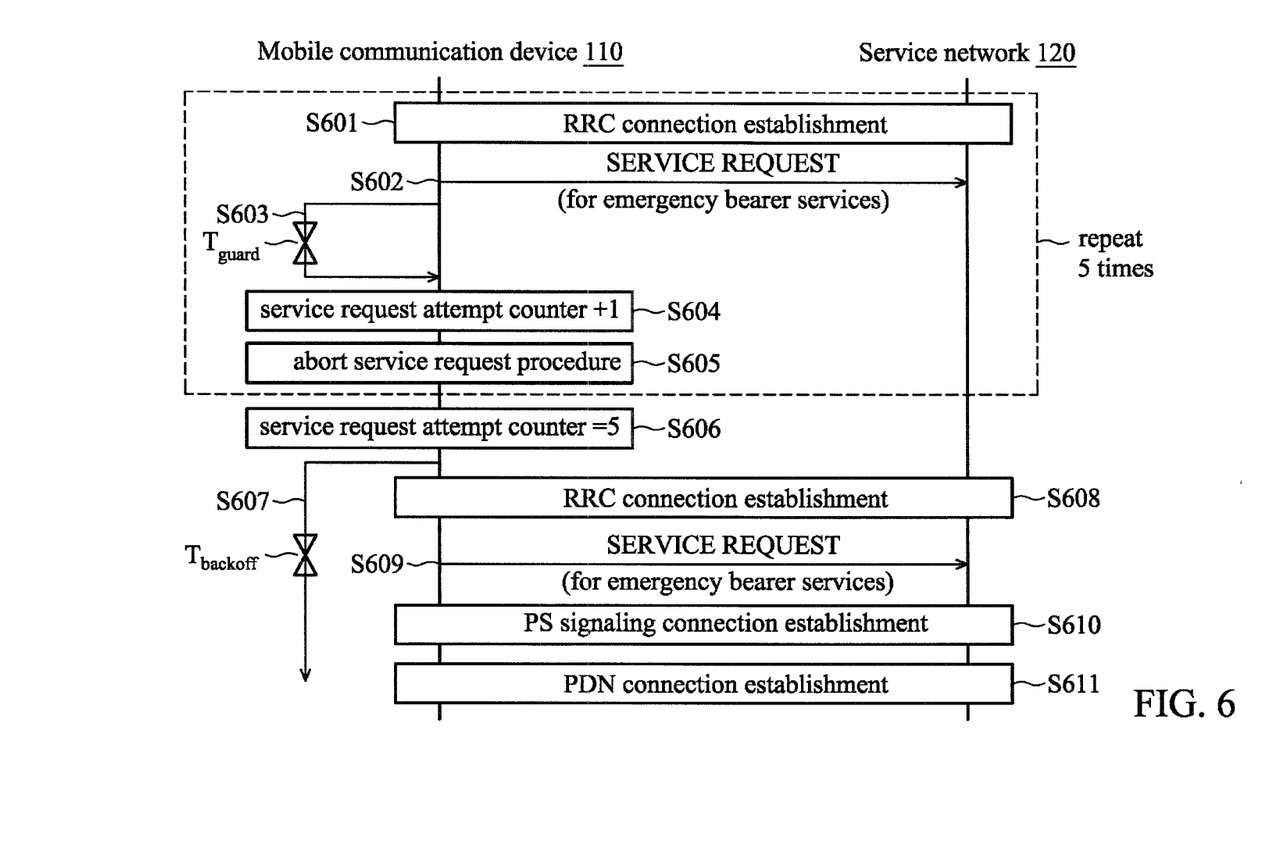
FIG. 6 is a message sequence chart illustrating the handling of service request procedures with back-off timer control according to the embodiment of FIG. 5.

FIG. 6 is a message sequence chart illustrating the handling of service request procedures with back-off timer control according to the embodiment of FIG. 5. To begin, the mobile communication device 110 initiates a service request procedure for an emergency bearer service. Specifically, the mobile communication device 110 establishes an RRC connection for signaling (step S601). The RRC connection establishment includes sending an RRC CONNECTION REQUEST message to the service network 120, receiving an RRC CONNECTION SETUP message from the service network 120, and replying with an RRC CONNECTION SETUP COMPLETE message to the service network 120, wherein the establishment cause in the RRC CONNECTION REQUEST message indicates an emergency case. When the RRC connection is successfully established, the mobile communication device 110 sends a SERVICE REQUEST message to the service network 120 (step S602), and starts a guard timer $T_{guard}$ when sending the SERVICE REQUEST message (step S603). Similar to the embodiment of FIG. 4, due to the service network 120 facing some temporary problems, the mobile communication device 110 does not receive any response corresponding to the SERVICE REQUEST message from the service network 120 before the guard timer $T_{guard}$ expires. When the guard timer $T_{guard}$ expires, the mobile communication device 110 increases the service request attempt counter by 1 (step S604), and then aborts the service request procedure (step S605).

In response to aborting the service request procedure, the mobile communication device 110 repeats steps S601 to S605 for 4 more times till the value of the service request attempt counter reaches 5 (i.e., the maximum number of retries). When determining that the service request attempt counter equals 5 (step S606), the mobile communication device 110 starts a back-off timer $T_{backoff}$ associated with the service request procedure (step S607), but continues with initiating the service request procedure for an emergency bearer service. Specifically, the mobile communication device 110 establishes an RRC connection with the service network 120 for signaling (step S608), wherein the RRC connection establishment is similar to step S601. However, it should be noted that, when the back-off timer $T_{backoff}$ is still running, the mobile communication device 110 is forbidden to initiate the service request procedure for a normal service. That is, the initiation of the service request procedure for an emergency bearer service is allowed, while the initiation of the service request procedure for a normal service is forbidden till the back-off timer $T_{backoff}$ expires.

When the RRC connection is successfully established, the mobile communication device 110 resends the SERVICE REQUEST message (step S609). In this embodiment, it is assumed that the temporary problems of the service network 120 have been resolved at this point, and thus, the service network 120 accepts the request and subsequently establishes a PS signaling connection with the mobile communication device 110 (step S610). After the PS signaling connection is successfully established, the mobile communication device 110 establishes a PDN connection with the service network 120 for the emergency bearer service (step S611).

In another embodiment, the mobile communication device 110 may not increase the service request attempt counter for each failed attempt of the service request procedure for an emergency bearer service, and thus, the back-off timer $T_{backoff}$ will not be started to prevent the mobile communication device 110 from retrying the service request procedure for an emergency bearer service.

Figure 7:
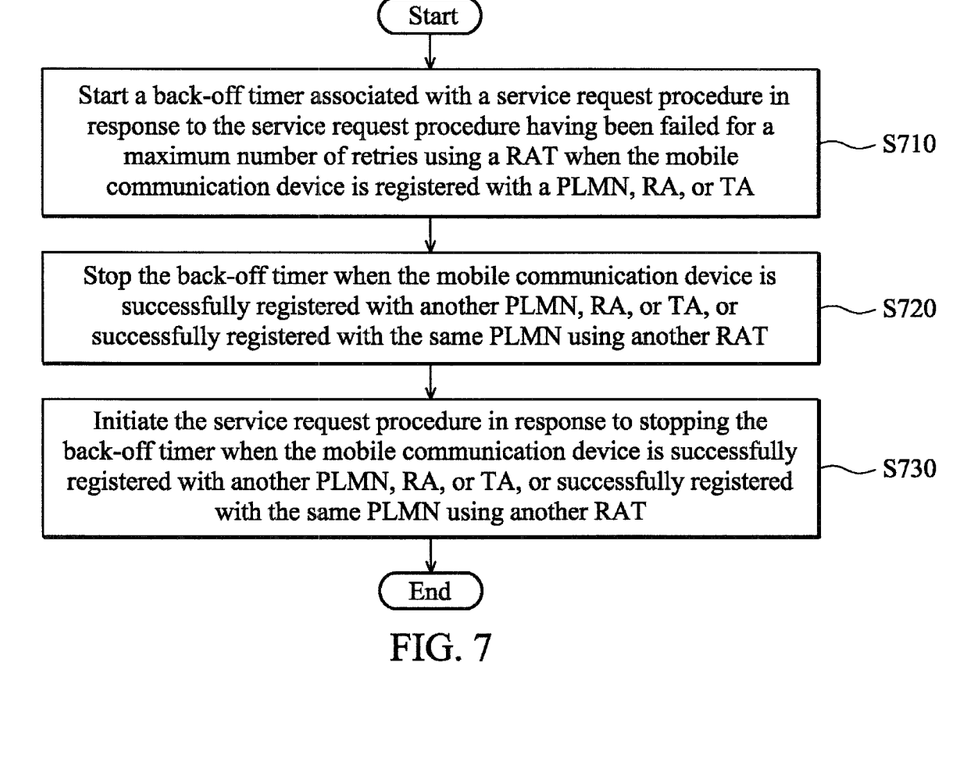
FIG. 7 is a flow chart illustrating the method for handling a service request procedure by a mobile communication device according to yet another embodiment of the invention.

FIG. 7 is a flow chart illustrating the method for handling a service request procedure by a mobile communication device according to yet another embodiment of the invention. To begin, the mobile communication device starts a back-off timer associated with a service request procedure in response to the service request procedure having been failed for a maximum number of retries using an RAT when it is registered with a PLMN, RA, or TA (step S710). That is, the service request for either a normal service or an emergency bearer service has been repeated for the maximum number of retries and has still failed, so the back-off timer is started to prevent the mobile communication device from initiating any service request procedure till it expires. Next, the mobile communication device stops the back-off timer when it is successfully registered with another PLMN, RA, or TA, or successfully registered with the same PLMN using another RAT (step S720). After that, the mobile communication device initiates the service request procedure in response to stopping the back-off timer when the mobile communication device is successfully registered with another PLMN, RA, or TA, or successfully registered with the same PLMN using another RAT (step S730). That is, unlike conventional UE which is not allowed to initiate the service request procedure regardless of whether it has selected another registered area or network, the mobile communication device of the invention is allowed to initiate the service request procedure when it has successfully registered with another area or network.

Figure 8:
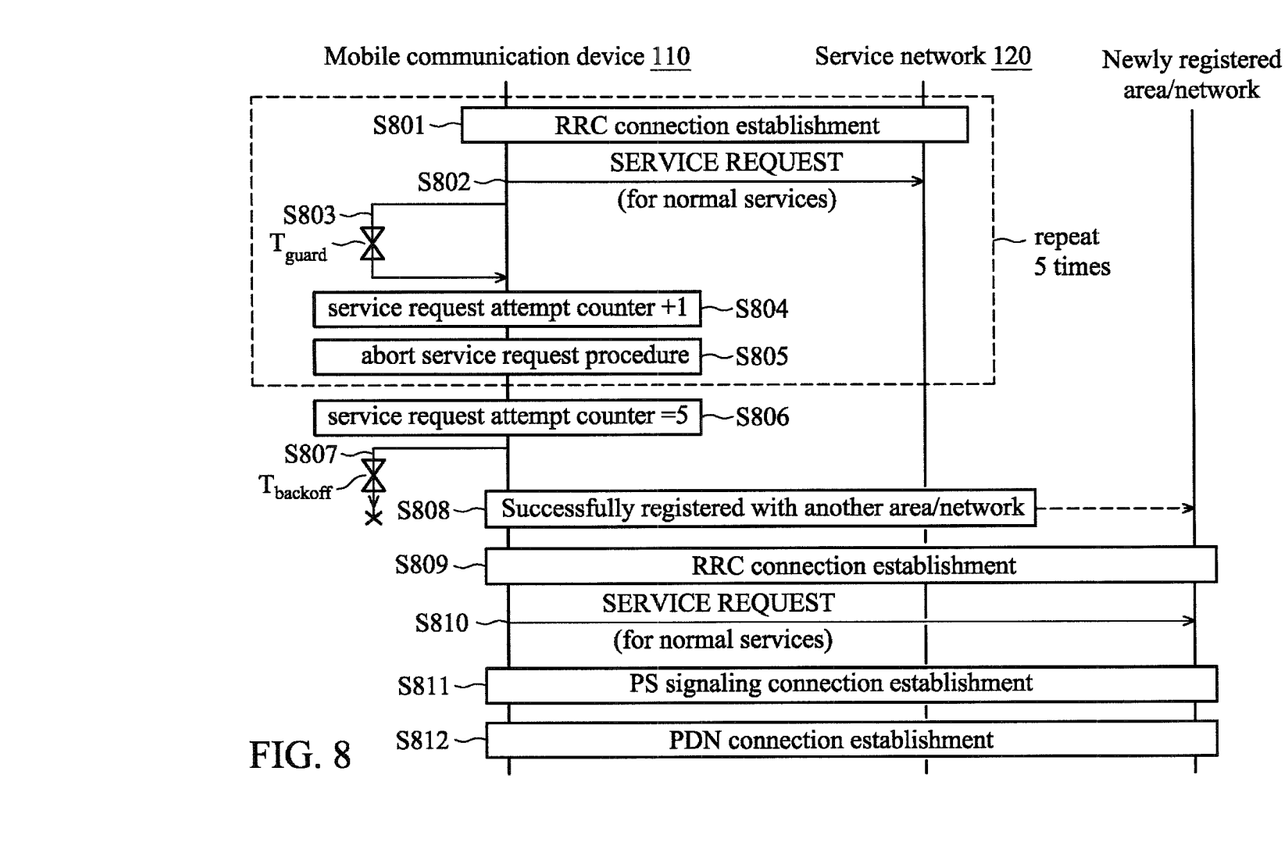
FIG. 8 is a message sequence chart illustrating the handling of service request procedures with back-off timer control according to the embodiment of FIG. 7.

FIG. 8 is a message sequence chart illustrating the handling of service request procedures with back-off timer control according to the embodiment of FIG. 7. To begin, the mobile communication device 110 initiates a service request procedure for a normal service with the currently registered PLMN, RA, TA. Specifically, the mobile communication device 110 establishes an RRC connection for signaling (step S801). The RRC connection establishment includes sending an RRC CONNECTION REQUEST message to the service network 120, receiving an RRC CONNECTION SETUP message from the service network 120, and replying with an RRC CONNECTION SETUP COMPLETE message to the service network 120, wherein the establishment cause in the RRC CONNECTION REQUEST message is set to a non-emergency case. When the RRC connection is successfully established, the mobile communication device 110 sends a SERVICE REQUEST message to the currently registered PLMN, RA, TA using an RAT (step S802), and starts a guard timer $T_{guard}$ when sending the SERVICE REQUEST message (step S803). Due to the currently registered area or network facing some temporary problems, the mobile communication device 110 does not receive any response corresponding to the SERVICE REQUEST message before the guard timer $T_{guard}$ expires. When the guard timer $T_{guard}$ expires, the mobile communication device 110 increases the service request attempt counter by 1 (step S804), and then aborts the service request procedure (step S805).

In response to aborting the service request procedure, the mobile communication device 110 repeats steps S801 to S805 for 4 more times till the value of the service request attempt counter reaches 5 (i.e., the maximum number of retries). When determining that the service request attempt counter equals 5 (step S806), the mobile communication device 110 starts a back-off timer $T_{backoff}$ associated with the service request procedure and is not allowed to initiate the service request procedure for a normal service until the back-off timer $T_{backoff}$ expires (step S807). Subsequently, due to the fact that the initiation of the service request procedure for a normal service is forbidden in the currently registered area or network, the mobile communication device 110 switches to register with another PLMN, RA, or TA, or with the same PLMN using another RAT (step S808). In one embodiment, the mobile communication device 110 may perform the PLMN selection procedure, the Routing Area Update procedure, or Tracking Area Update procedure, to register with another PLMN, RA, or TA.

When the mobile communication device 110 is successfully registered with another PLMN, RA, or TA, or with the same PLMN using another RAT, the mobile communication device 110 stops the back-off timer $T_{backoff}$ (denoted with a cross mark in FIG. 8), and then initiates the service request procedure for a normal service with the newly registered area or network. Specifically, the mobile communication device 110 establishes an RRC connection with the newly registered area or network for signaling (step S809), wherein the RRC connection establishment is similar to step S801.

When the RRC connection is successfully established, the mobile communication device 110 sends a SERVICE REQUEST message to the newly registered area or network (step S810). In this embodiment, it is assumed that the newly registered area or network functions normally, and thus, the newly registered area or network accepts the request and subsequently establishes a PS signaling connection with the mobile communication device 110 (step S811). After the PS signaling connection is successfully established, the mobile communication device 110 establishes a PDN connection with the newly registered area or network for the emergency bearer service (step S812).

Specifically for the WCDMA technology in compliance with the TS 24.301 and TS 24.008 specifications, the guard timer $T_{guard}$ in steps S403, S603, and S803 may be referred to as T3317, while the PDN connection establishment in steps S411, S611, and S812 may involve the mobile communication device 110 sending an ACTIVATE PDP CON- TEXT REQUEST message to the mobile communication device 110, and the service network 120 or the newly registered area or network replying with an ACTIVATE PDP CONTEXT ACCEPT message to the mobile communication device 110, wherein the ACTIVATE PDP CONTEXT REQUEST message includes a "Request type" Information Element (IE) set to emergency.

Specifically for the LTE/LTE-A technology in compliance with the TS 24.301 and TS 24.008 specifications, the guard timer $T_{guard}$ in steps S403, S603, and S803 may be referred to as T3417, while the PDN connection establishment in steps S411, S611, and S812 may involve the mobile communication device 110 sending a PDN CONNECTION REQUEST message to the service network 120 or the newly registered area or network, and the service network 120 or the newly registered area or network replying with an ACTIVATE DEFAULT EPS BEARER CONTEXT REQUEST message to the mobile communication device 110, and the mobile communication device 110 replying with an ACTIVATE DEFAULT EPS BEARER CONTEXT ACCEPT message to the service network 120, wherein the PDN CONNECTION REQUEST message includes a "Request type" IE set to emergency.

While the invention has been described by way of example and in terms of preferred embodiment, it is to be understood that the invention is not limited thereto. Those who are skilled in this technology can still make various alterations and modifications without departing from the scope and spirit of this invention. For example, the method for handling a service request procedure may also be applied to any mobile communication device in compliance with any evolutionary technology of the LTE/LTE-Advanced technology. Therefore, the scope of the present invention shall be defined and protected by the following claims and their equivalents.

What is claimed is:

1. A method for handling a service request procedure by a mobile communication device, the method comprising:
   starting a back-off timer associated with a service request procedure in response to the service request procedure for a non-emergency service having been failed for a maximum number of retries;
   initiating another service request procedure for an emergency bearer service before the back-off timer expires;
   stopping the back-off timer when initiating the service request procedure for an emergency bearer service; and
   forbidding any retry of the service request procedure for a non-emergency service with the PLMN when the back-off timer is running,
   wherein the service request procedure for a non-emergency service is performed using a first Radio Access Technology (RAT) supported by a Public Land Mobile Network (PLMN), and the service request procedure for an emergency bearer service is initiated using a second RAT supported by the PLMN or is initiated with another PLMN.

2. A method for handling a service request procedure by a mobile communication device, the method comprising:
   starting a back-off timer associated with a service request procedure for a non-emergency service in response to the service request procedure for a non-emergency service having been failed for a maximum number of retries using a first Radio Access Technology (RAT) when the mobile communication device is registered with a first Public Land Mobile Network (PLMN);
   forbidding initiating the service request procedure for a non-emergency service when the back-off timer is running, before the mobile communication device is successfully registered with a second PLMN or successfully registered with the first PLMN using a second RAT;
   stopping the back-off timer when the mobile communication device is successfully registered with the second PLMN or successfully registered with the first PLMN using the second RAT; and
   initiating the service request procedure for a non-emergency service in response to stopping the back-off timer when the mobile communication device is successfully registered with the second PLMN or successfully registered with the first PLMN using the second RAT.

3. A mobile communication device, comprising:
   a Radio Frequency (RF) device, configured to perform wireless transmission and reception to and from a service network; and
   a controller, configured to start a back-off timer associated with a service request procedure in response to the service request procedure for a non-emergency service having been failed for a maximum number of retries, initiate another service request procedure for an emergency bearer service via the RF device before the back-off timer expires, stop the back-off timer when initiating the service request procedure for an emergency bearer service via the RF device, and forbid any retry of the service request procedure for a non-emergency service with the PLMN when the back-off timer is running,
   wherein the service request procedure for a non-emergency service is performed using a first Radio Access Technology (RAT) supported by a Public Land Mobile Network (PLMN), and the service request procedure for an emergency bearer service is initiated using a second RAT supported by the PLMN or is initiated with another PLMN.

4. A mobile communication device, comprising:
   a Radio Frequency (RF) device, configured to perform wireless transmission and reception to and from a service network; and
   a controller, configured to start a back-off timer associated with a service request procedure for a non-emergency service in response to the service request procedure for a non-emergency service having been failed for a maximum number of retries using a first Radio Access Technology (RAT) when the mobile communication device is registered with a first Public Land Mobile Network (PLMN), forbid initiating the service request procedure for a non-emergency service when the back-off timer is running before the mobile communication device is successfully registered with a second PLMN or successfully registered with the first PLMN using a second RAT, stop the back-off timer when the mobile communication device is successfully registered with the second PLMN or successfully registered with the first PLMN using the second RAT, and initiate the service request procedure for a non-emergency service in response to stopping the back-off timer when the mobile communication device is successfully registered with the second PLMN or successfully registered with the first PLMN using the second RAT.

\* \* \* \* \*